United States Patent Office 3,804,915
Patented Apr. 16, 1974

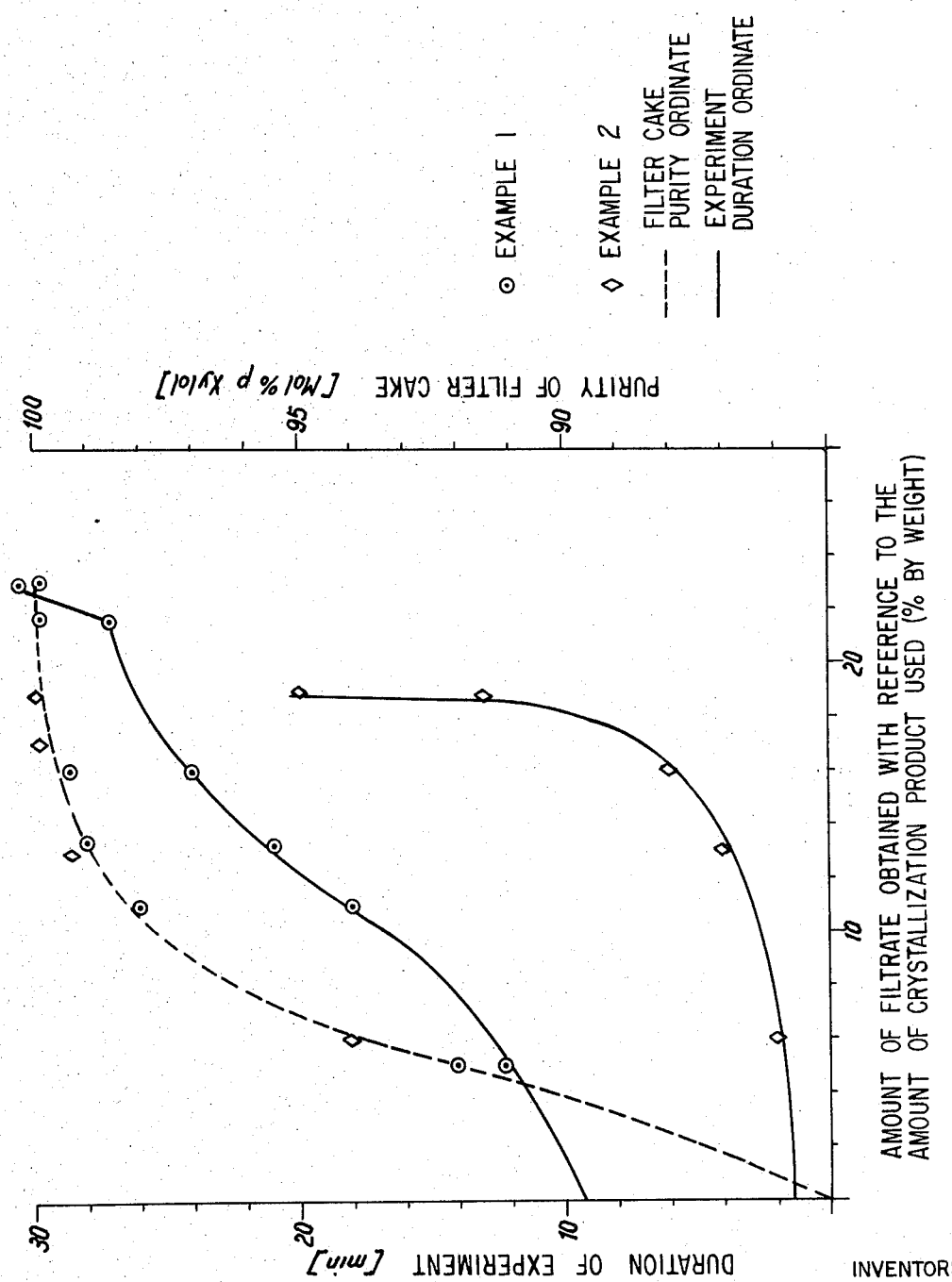

3,804,915
PURIFICATION OF PARAXYLENE
Karl Schmid, Karlheinz Schauerte, Hans Werner Kirchhof, Horst Gelbe, Essen, Hans Georg Tilgner, Mulheim-Saarn, and Richard Wenderoth, Essen, Germany, assignors to Fried Krupp Gesellschaft mit beschränkter Haftung, Essen, Germany
Continuation of application Ser. No. 136,224, Apr. 21, 1971, which is a continuation of application Ser. No. 787,735, Dec. 30, 1968, both now abandoned. This application July 14, 1972, Ser. No. 271,761
Claims priority, application Germany, Dec. 29, 1967, P 16 43 724.4
Int. Cl. C07c 7/14
U.S. Cl. 260—674 A   10 Claims

ABSTRACT OF THE DISCLOSURE

High purity p-xylene is crystallized from $C_8$ aromatic mixtures at a temperature above their eutectic point, and separated p-xylene is purified by passing an inert fluid through the filter cake.

CROSS REFERENCE TO RELATED APPLICATION

This application is a continuation of copending application Ser. No. 136,224, filed Apr. 21, 1971, now abandoned, which itself is a continuation of application Ser. No. 787,735, filed Dec. 30, 1968, now abandoned.

BACKGROUND OF THE INVENTION

A commercial mixture of three isomers, o-, m- and p-xylene, wherein the last two isomers usually predominate, is known as xylene or xylol. Attempts have been made to isolate p-xylene from this and other mixtures with $C_8$ aromatics.

p-Xylene is an important raw material in the manufacture of terephthalic acid on which are based polyester fibers, such as Dacron, and polyester films, such as Mylar.

In mixtures with isomeric $C_8$ aromatics p-xylene has been materially concentrated to obtain a product having a higher p-xylene content, i.e. purer p-xylene.

Generally, p-xylene is crystallized from a mixture of isomeric $C_8$ aromatics containing 17% to 23% by weight of p-xylene at temperatures of $-60°$ to $-80°$ C., and the mother liquor is separated by filtering or centrifuging. The resulting crystallization product has a p-xylene content of from 70% to 85% by weight. Greater purities are very difficult to realize.

Higher purity can be obtained by multistage recrystallization or multistage washing with a solution of higher p-xylene concentration. Alternatively, p-xylene can be pressed out in a snail press or an admixture can be washed with hydrocarbons having a low boiling point. All of these processes, however, require high investments since they either utilize, as do the multistage processes, a plurality of identical units, or, as in the case of the use of pulsating columns, expensive apparatus. When the p-xylene crystallization product is washed with hydrocarbons having a low boiling point, part of the p-xylene forms a solution with the washing agent and must be re-extracted therefrom. Moreover, additional process steps are required to separate the material used for the washing from the purified p-xylene.

SUMMARY OF THE INVENTION

Although it was previously assumed that higher purities required initial removal of mother liquor adhering to p-xylene crystals and recrystallization of resulting crystals, such is not in accord with the present invention wherein purities of more than 99.5% by weight can be realized if, in a known manner, p-xylene is crystallized out of a $C_8$ aromatic mixture, which may contain impurities of other hydrocarbons, e.g. portions of $C_9$, at low temperatures and the mother liquor is subsequently separated, e.g. in a filter, and the filter cake is purified in such a manner that an inert medium, which carries with it the mother liquor adhering to p-xylene crystals from the filter cake, is passed through the filter cake. The temperature of the inert medium is above the temperature of the eutectic point of the mixture immediately prior to passing through the filter cake. Melting or dissolving the p-xylene crystals is not necessary. A high purity of more than 99.5% by weight can be realized in only one stage if desired. Accordingly, crystals of pure p-xylene are formed during the crystallization of p-xylene from $C_8$ aromatic mixtures at temperatures above the eutectic point. Impurities remaining after the separation of the mother liquor are those contained in the liquid film of the mother liquor on the surface of the crystals. According to the present invention this liquid film may be almost completely removed.

An object of this invention is to isolate p-xylene (1,4-dimethylbenzene) from mixtures thereof with other aromatics, primarily hydrocarbons having eight carbon atoms ($C_8$) which are isomers of p-xylene.

Another object is to obtain p-xylene of high purity. A further object is to reduce the steps for and/or expense of purifying or concentrating p-xylene. Additional objects appear from the description which follows.

BRIEF DESCRIPTION OF THE DRAWINGS

The sole drawing graphically illustrates the relationship between obtained filtrate, filtration time and filter cake purity.

DESCRIPTION OF THE PREFERRED EMBODIMENTS

Different parameters, which are interdependent, are of importance with respect to the purity of p-xylene produced. An important parameter is the period the filter cake remains in the stream of the medium passed through it. On-stream time may vary from 0.5 to 30 minutes, but is preferably from 2 to 12 minutes if a crystallization product containing 85% by weight p-xylene is purified to a product containing more than 99% by weight p-xylene. Prolonging the period during which the filter cake is in the medium stream results in higher purities. In practice, however, a maximum value can only asymptotically be reached.

The purity of the p-xylene depends on the density and compactness of the filter cake and on the amount of gaseous or vaporous inert medium passed through the filter cake.

Higher purities may be obtained by increasing the density of the filter cake to values of more than 0.5 gram per cubic centimeter (g./cm.$^3$), i.e. even when all other parameters are maintained constant. Increased density is obtained, e.g., by compressing, stamping, rolling or flattening the filter cake, which effectively increases the speed of the inert medium through the filter cake under otherwise unchanged conditions and simultaneously provides for uniform flow distribution. In this way a purity of more than 99.5% by weight can be obtained in as short a period as 25 minutes even for a relatively small throughput of inert medium, such as 20 m.$^3$/m.$^2$ of filter surface an hour. The compression of the filter cake can be realized, e.g., by rolls on a rotary-cell filter. An increase in the throughput of inert medium will permit the duration of the filtering to be shortened with the other conditions remaining the same. The range of flow for the inert gaseous medium may vary from about 10 to 2,000 m.$^3$/m.$^2$ of filter surface an hour, but is preferably from 50 to 1,000, e.g. from 50 to 800 m.$^3$/m.$^2$ an hour. It will be understood that filter surface means the surface of the filter cake.

The process according to the invention can be operated continuously as well as discontinuously and can also be used for large quantities. Known filtering apparatus which permits passing inert media through the filter cake, for example, suction filters, rotary cell filters, band filters and the like, can be employed. Inert media are gases and vapors which do not react with p-xylene. Exemplary inert media are: air and nitrogen. The inert media can be used separately, in combinations and/or sequentially.

The subject process results in very pure p-xylene even after a one-stage operation. Recrystallization, partial melting or washing is not necessary. It will be understood that partial melting means preferred melting of the small and growing of the large crystals which is pre-condition for the use of centrifuges for separating p-xylene. This process thus makes possible a reduced investment, avoidance of additional apparatus stages and substantially reduced energy consumption.

Exemplary embodiments of the present invention follow. The examples are presented solely for the purposes of illustration and in no way limit the nature or scope of the invention.

EXAMPLE 1

A crystallization product (300 g.) containing p-, m- and o-xylene and ethylbenzene and having a p-xylene concentration of 85% by weight is placed in a glass suction filter cooled to $-40°$ C. A current of air at a temperature of $20°$ C. is passed through the solids in the cooled suction filter at a rate of 20 $Nm.^3/m.^2$ of filter surface per hour. $Nm^3$ means standard cubic meter at standard temperature and pressure, i.e., 760 mm. Hg and $0°$ C. Samples are taken from the filter cake at given time intervals and analyzed. During the filtration the filter cake is regularly compressed and flattened, and the removed mother liquor is measured.

The data obtained are reflected in the figure of drawing. After twenty-four minutes the amount of filtrate collected is 16% by weight based on the weight of the starting crystallization product, and the filter cake has a p-xylene purity of 99.5% by weight. The starting product contained 15.5 % by weight of ethylbenzene,
22.7% by weight of p-xylene,
41.7% by weight of m-xylene and
19.9% by weight of o-xylene.

It was crystallized in a scraped surface exchanger and crystallized. p-Xylene was separated from the mother liquor to a concentration of 85% by weight in a centrifuge.

A final purity of 99.8% by weight p-xylene is obtained.

Replacing the air with nitrogen passed through the filter cake at the same rate yields essentially identical results.

EXAMPLE 2

Following the procedure of Example 1 except for passing the current of air at a temperature of $14°$ C. through the filter cake at a rate of 130 $Nm.^3/m.^2$ of filter surface per hour yields a final p-xylene purity of 99.98% by weight. After only 5 minutes of filtration a purity of 99.5% by weight-p-xylene is obtained with 16% by weight of filtrate.

Reference is made to the drawing for further data relating to this example.

It will be understood that the above description of the present invention is susceptible to various modifications, changes and adaptations.

In the claims:

1. A process which comprises separating and collecting as filter cake p-xylene crystallized from a mixture of $C_8$ aromatic compounds above its eutectic point, without prior washing of the filter cake passing an inert gaseous medium, having a temperature above that of the eutectic point of the mixture, through the filter cake for a period of at least 0.5 minute in a stream which carries with it mother liquor adhering to p-xylene crystals and at a rate of between 50 and 2000 cubic meters per square meter of filter cake surface per hour, compressing the filter cake to a density of more than 0.5 gram per cubic centimeter during the passage of the inert medium and obtaining a p-xylene concentration in excess of 98 percent by weight.

2. A process according to claim 1 which comprises separating p-xylene crystallized from a mixture of $C_8$ aromatic compounds above its eutectic point, passing an inert gaseous medium, having a temperature above that of the eutectic point of the mixture, through the resulting filter cake in a stream at a rate of between 50 to 1000 cubic meters per square meter of filter cake surface per hour, compressing the filter cake to a density of more than 0.5 gram per cubic centimeter during the passage of the inert medium and obtaining a p-xylene concentration in excess of 99.0 percent by weight.

3. A process according to claim 1 which comprises separating p-xylene crystallized from a mixture of $C_8$ aromatic compounds above its eutectic point, passing an inert gaseous medium, having a temperature above that of the eutectic point of the mixture, through the resulting filter cake for a period of from 0.5 to 30 minutes in a stream at a rate of between 50 and 800 cubic meters per square meter of filter cake surface per hour, compressing the filter cake to a density of more than 0.5 gram per cubic centimeter during the passage of the inert medium and obtaining a p-xylene concentration in excess of 98 percent by weight.

4. A process according to claim 3 wherein a p-xylene purity in excess of 99.5 percent by weight is obtained.

5. A process according to claim 3 wherein the inert gaseous medium is air.

6. A process according to claim 3 which comprises separating p-xylene crystallized from a mixture of $C_8$ aromatic compounds above its eutectic point, passing an inert gaseous medium, having a temperature above that of the eutectic point of the mixture, through the resulting filter cake for a period of from 2 to 12 minutes in a stream at a rate of between 50 and 800 cubic meters per square meter of filter cake surface per hour, compressing the filter cake to a density of more than 0.5 gram per cubic centimeter during the passage of the inert medium and obtaining a p-xylene concentration in excess of 99.0 percent by weight.

7. A process according to claim 5 for increasing p-xylene purity from about 85 percent by weight to more than 99.0 percent by weight.

8. A four-step process according to claim 1 which comprises:
   (a) crystallizing p-xylene from a mixture of $C_8$ aromatic compounds;
   (b) collecting thus-crystallized p-xylene in filter cake at a temperature above that of the eutectic point of the mixture;
   (c) passing an inert gaseous medium, having a temperature above that of the eutectic point of the mixture, through the filter cake in a stream which carries with it mother liquor adhering to p-xylene crystals and at a rate of between 50 and 2000 cubic meters per square meter of filter cake surface per hour; and
   (d) compressing the filter cake to a density of more than 0.5 gram per cubic centimeter during the passage of the inert medium, thus obtaining a p-xylene concentration in excess of 98 percent by weight.

9. A three-step process according to claim 1, which comprises:
   (a) collecting in filter cake p-xylene crystallized from a mixture of $C_8$ compounds, the collecting being effected at a temperature above that of the eutectic point of the mixture;
   (b) passing an inert gaseous medium, having a temperature above that of the eutectic point of the mixture, through the filter cake in a stream which carries with it mother liquor adhering to p-xylene crystals and at a rate of between 50 and 2000 cubic meters per square meter of filter cake surface per hour; and
(c) compressing the filter cake to a density of more than 0.5 gram per cubic centimeter during the passage of the inert medium, thus obtaining a p-xylene concentration in excess of 98 percent by weight.

10. A process which consists essentially of
(a) collecting in filter cake p-xylene crystallized from a mixture of $C_8$ aromatic compounds, the collecting being effected at a temperature above that of the eutectic point of the mixture;
(b) passing an inert gaseous medium, having a temperature above that of the eutectic point of the mixture, for at least 0.5 minute through the filter cake in a stream which carries with it mother liquor adhering to p-xylene crystals and at a rate of between 20 and 2000 cubic meters per square meter of filter cake surface per hour; and
(c) compressing the filter cake to a density of more than 0.5 gram per cubic centimeter during the passage of the inert medium, thus obtaining a p-xylene concentration in excess of 98 percent by weight.

References Cited
UNITED STATES PATENTS

| | | | |
|---|---|---|---|
| 2,614,134 | 10/1952 | Powers | 260—674 |
| 2,904,412 | 9/1959 | McBride et al. | 260—674 |
| 3,219,722 | 11/1965 | Jakob | 260—674 |
| 3,487,652 | 1/1970 | McKay | 260—674 |
| 3,433,816 | 3/1969 | Muller | 260—674 |
| 2,823,241 | 2/1958 | Bennett et al. | 260—674 |
| 3,182,098 | 4/1965 | Van Wijk | 260—674 |

DELBERT E. GANTZ, Primary Examiner
C. E. SPRESSER, Jr., Assistant Examiner